Nov. 2, 1965
REIZO SUZUKI ETAL
3,215,228
APPARATUS FOR PREVENTION OF FORWARD AND
BACKWARD MOVEMENTS OF VEHICLES
Filed Feb. 18, 1964
2 Sheets-Sheet 1
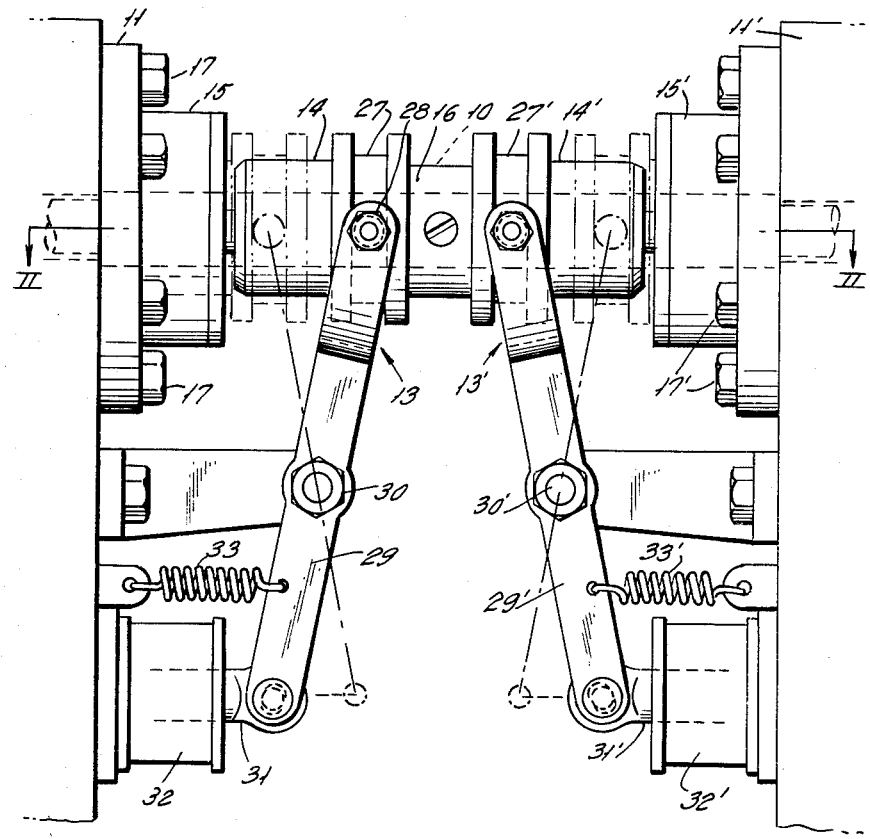
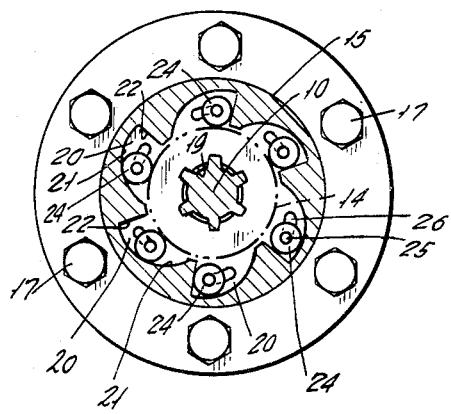
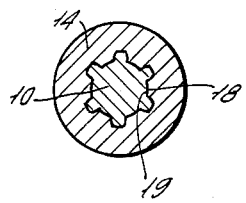
INVENTORS
REIZO SUZUKI
TOSHIO TAKABAYASHI
BY
OSTROLENK, FABER, GERB & SOFFEN
ATTORNEYS

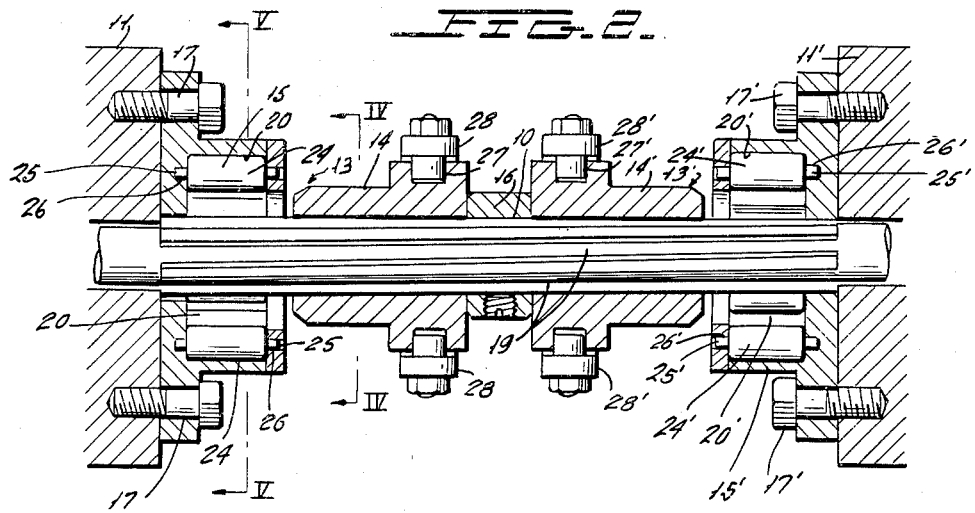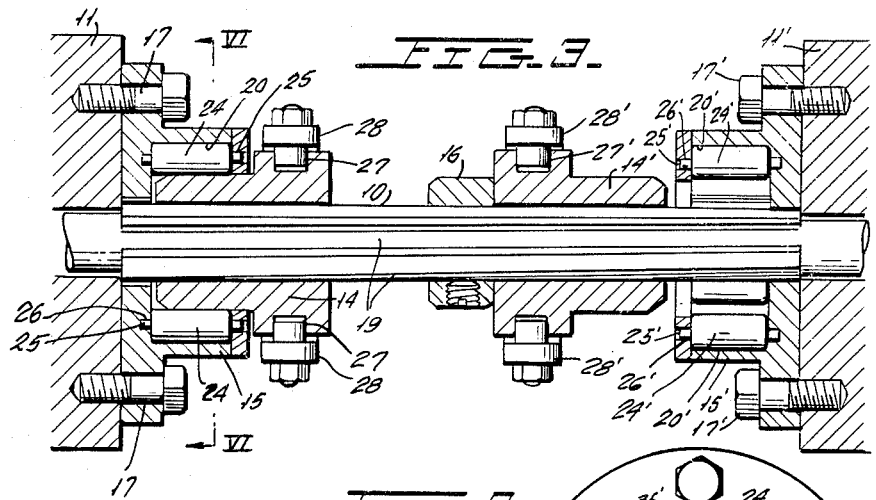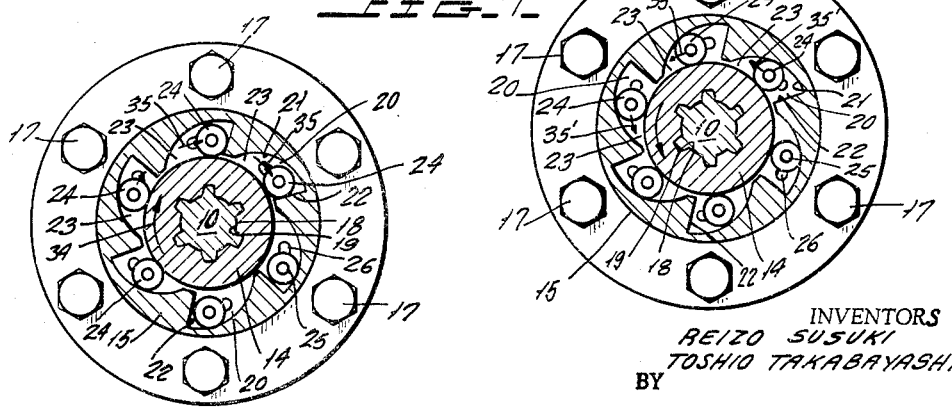

United States Patent Office 3,215,228
Patented Nov. 2, 1965

3,215,228
APPARATUS FOR PREVENTION OF FORWARD AND BACKWARD MOVEMENTS OF VEHICLES
Reizo Suzuki and Toshio Takabayashi, Minato-ku, Tokyo, Japan, assignors to Reizo Suzuki, Toshio Takabayashi, and Michitada Miwa, jointly
Filed Feb. 18, 1964, Ser. No. 345,671
Claims priority, application Japan, Aug. 13, 1963, 38/59,767
3 Claims. (Cl. 188—82.5)

The present invention relates to an apparatus for selectively preventing forward or backward movement of a vehicle such as an automobile, and more particularly to a locking mechanism for preventing rotation of a rotatable shaft associated with such a vehicle, in either a clockwise or counterclockwise direction corresponding to the forward or backward movement of the vehicle.

It is among the objects of the invention to provide a locking mechanism of the character described, two of which may be incorporated in a vehicle braking apparatus, and which may be separately or simultaneously actuated to prevent rotation of a shaft, and movement of the vehicle with which it is associated in either or both of its opposite directions of movement.

An additional object of the invention is to provide such an apparatus, the elements of which do not engage one another prior to their actuation, thereby minimizing wear and tear of the operating elements, and providing a device having a relatively long useful life and relatively low maintenance costs.

The nature and objects of the present invention will be more fully apparent from a consideration of the following detailed description thereof, taken in connection with the accompanying drawings in which:

FIGURE 1 is a side elevation of a preferred embodiment of the apparatus hereof;

FIGURE 2 is a horizontal section through the embodiment illustrated in FIGURE 1, viewed along the line II—II in FIGURE 1;

FIGURE 3 is a horizontal section similar to FIGURE 2, illustrating one of the locking mechanisms of the device in its operative position;

FIGURE 4 is a vertical section taken along the line IV—IV in FIGURE 2;

FIGURE 5 is a vertical section taken along the line V—V in FIGURE 2;

FIGURE 6 is a vertical section taken along the line VI—VI in FIGURE 3, illustrating the free rotation of a shaft associated with the apparatus; and FIGURE 7 is a vertical section similar to FIGURE 6, illustrating the manner in which the apparatus of the invention prevents rotation of the associated shaft in a given direction opposite from that illustrated in FIGURE 6.

In accordance with the present invention, a locking mechanism is provided for preventing rotation of a shaft in a given direction, comprising a pair of tubes mounted concentrically of the shaft, a first of which tubes is fixed and the second of which rotatably engages the shaft, and which tubes are adapted to be disposed in superposed relation. The first tube is provided with a plurality of recesses formed in one surface thereof extending lengthwise of the tube, each of such recesses gradually increasing in depth from one side to the other and receiving an elongated roller which is rotatably mounted and laterally displaceable therein. The periphery of the second tube, when superposed with the first tube, engages the peripheries of the several rollers so that the imposition of a torque upon the rotatable shaft in the given direction produces an opposing torque on the rollers and wedges them into the shallow sides of the respective recesses, thereby preventing rotation of the second tube and the shaft in such direction.

It will be noted that the locking mechanism does not prevent rotation of the shaft in the direction opposite from the direction indicated since such rotation displaces the rollers mounted within the several recesses away from the shallow portions thereof, facilitating simultaneous rotation of the rollers and the second tube without interference with the rotation of the latter or with the rotation of the shaft keyed therewith.

It is within the purview of the present invention to provide two such locking mechanisms in association with a single rotary shaft, which shaft may rotate in accordance with the rotation of the moving wheel of an automobile or other vehicle, to selectively or simultaneously prevent clockwise or counterclockwise movement of the shaft and corresponding backward and forward movement, for example, of the associated vehicle. In such case, each locking mechanism has the structure described hereinabove, the openings in the outer tube of one locking mechanism and openings in the outer tube of the second locking mechanism being oriented in opposed relation to each other to facilitate converse operation of the respective devices. It will be understood that the respective locking mechanisms are provided with actuator elements which may be operated selectively or simultaneously to lock the rotary shaft and the associated vehicle and thereby prevent forward and/or backward movement of such vehicle.

Turning to the embodiment illustrated in the drawings, a rotary shaft 10 is shown which may rotate with the moving wheel of an automobile or other vehicle and is journaled for rotation between opposed fixed portions 11 and 11' of the vehicle body. Mounted concentrically of the shaft 10 and separated by a collar 16 on the shaft, are a pair of locking mechanisms generally designated as 13 and 13' in the drawing, the unit 13 adapted to prevent counterclockwise rotation of the shaft 10, when viewed in the direction of FIGURES 4–7, and the unit 13' adapted to prevent the opposite, clockwise rotation of the shaft.

Referring initially to the locking mechanism 13, it will be noted that such mechanism comprises a pair of tubes, i.e., an inner tube 14 and an outer tube 15, mounted concentrically of the rotary shaft 10.

The outer tube 15 is attached by means of bolts 17 to the side wall of the fixed portion 11 of the vehicle body, whereas the inner tube rotatably engages the shaft 10 by means of spline teeth 18 engaging mating spline grooves 19 on the rotary shaft. As described more fully hereinafter, the tubes 14 and 15 are adapted to be disposed in superposed relation to facilitate locking the rotary shaft 10 against rotation in the counterclockwise direction specified above.

The outer tube 15 has a number of radial recesses or openings 20 extending lengthwise of its inner surface, each of which is bounded by a concave wall surface 21 so formed that the depth of the opening increases gradually in one direction and terminates in a side edge 22 extending generally radially of the outer tube 15. The openings 20 thus vary in depth from relatively deep portions adjacent the edges 22 to relatively shallow portions adjacent their opposite sides. As shown in FIGURE 5, when the outer tube 15 is disposed in superposed relation with the inner tube 14 the shallow portion of each opening 20 defines a V-shaped or wedge-shaped gap 23 between the adjacent wall surface 21 and the outer periphery of the inner tube 14. A roller 24 is rotatably housed within each of the openings 20, supported at its opposite ends 25 within guide grooves 26 formed in the walls of the outer tube. As described below, when the inner tube 14 and the outer tube 15 are disposed in superposed relation, planetary movement of the rollers about the inner tube into the wedge-shaped gap 23 prevents movement of the shaft 10 and the inner tube relative to the fixed outer tube, in accordance with the present invention.

The inner tube 14 is, as noted above, rotatably engaged with the shaft 10 by means of the spline teeth 18 and engaging spline grooves 19 on the shaft. The engaging splines extend lengthwise of the shaft 10 and are slightly inclined (see FIGS. 2 and 3) relative to the axis of the shaft. The inclination of the mating splines helps effect disengagement of the inner and outer tubes when it is desired to de-actuate the locking mechanism.

The inner tube includes an outer annular groove 27 to which is pivoted bifurcated end 28 of an operating lever 29 designed to effect movement of the inner tube lengthwise of the shaft 10. The operating lever is pivoted intermediate its ends at a fulcrum 30 and connected to an actuating link 31 at the end opposite from that connected to the inner tube 14. The actuating link 31 may be controlled in any suitable manner; e.g., by a magnet 32 which actuates the operating lever in the manner of a solenoid. Alternatively, the actuator link 31 may be manually controlled, operated by fluid pressure or the like.

In the embodiment illustrated, the operating lever 29 is ordinarily biased into the position illustrated in FIGURE 1 with the inner tube 14 biased out of operative engagement with the outer tube 15 by means of a compression spring 33. Energization of the magnet 32 pivots the operating lever 29 against the force of spring 33, thereby moving the inner tube 14 longitudinally of shaft 10 and into operative relation with the outer tube 15.

In operation, when it is desired to prevent rotation of the shaft 10 in a counterclockwise direction, viewing FIGURES 5–7, the operating lever 29 is actuated against the force of spring 33 to move the inner tube 14 from the position illustrated in FIGURES 1 and 2 to that shown in FIGURE 3 of the drawings. The inner tube 14 is thus moved lengthwise of the shaft 10 into the annular zone between the outer tube 15 and the shaft 10. When thus inserted within the outer tube, the peripheral surface of the inner tube 14 abuts and is in driving relation with the peripheries of the several rollers 24 mounted within the internal openings 20 of the outer tube.

As illustrated in FIGURE 6, when the shaft 10 and the inner tube 14 rotatably engaged therewith, are rotated clockwise in the direction of arrow 34 the rollers 24 are displaced lengthwise of the grooves 26 in the direction of arrows 35. The rollers thereby complete a planetary movement into the deeper portions of the openings 20, where they are free to rotate in the counter-clockwise direction in synchronism with the rotary shaft 10 and inner tube 14. The foregoing occurs without preventing or otherwise inhibiting the rotation of the shaft 10 in clockwise direction 34.

On the other hand, when a counterclockwise torque in the direction of 34' (FIGURE 7) is impressed on the shaft 10, the rollers 24 are displaced in the direction of arrows 35', from the deeper portions of the openings 20 toward the shallow portions thereof. The rollers are thus forced or wedged into the gap 23 defined between the inner and outer tubes, thereby locking the inner tube 14 and the shaft 10 engaged therewith and preventing rotation thereof in the indicated counterclockwise direction 34'. By thus preventing rotation of the shaft in the counterclockwise direction the locking mechanism prevents longitudinal movement of the vehicle in the direction corresponding to such rotation of the shaft.

When it is desired to de-actuate the locking mechanism 13, the operating lever 29 is moved back to its initial position, returning the inner tube 14 from the position shown in FIGURE 3 to that illustrated in FIGURES 1 and 2 of the drawing. It will be noted that the initial longitudinal movement produced by the operating lever effects a clockwise rotation of the inner tube 14, due to the inclination of the mating spline teeth and groove construction rotatably mounting the inner tube upon shaft 10. Such slight rotation tends to displace the rollers 24 from the locked position illustrated in FIGURE 7 to the free position illustrated in FIGURE 6, thus facilitating the ready disengagement of the inner tube from the outer tube assembly.

The locking mechanism 13' is actuated by elements 29', 30', 31', 32', and 33' in the same manner as described hereinabove in connection with locking mechanism 13. Thus, the locking mechanisms 13 and 13' may be selectively or simultaneously actuated to prevent rotation of the shaft 11 in either or both of the clockwise and counterclockwise directions, and correspondingly prevent longitudinal movement of the vehicle associated therewith in either the forward, backward, or in both directions.

It will be apparent that, since the inner and outer tubes of each locking mechanism are separated from one another prior to actuation of the respective mechanisms, loss of driving power and mechanical wear of the elements of such mechanisms is minimized. Hence, the apparatus of the present invention, while relatively simply constructed and accurate in operation, possesses a long useful life and requires a minimum of maintenance.

It will be understood that the apparatus hereof may be modified in such a manner that the inner tube 14 may be fixed and may define the several openings 20 for the rollers 24, while the outer tube 15 may be suitably engaged with the shaft 10 to rotate therewith. Since this and other changes may be made in the embodiment described hereinabove and shown in the accompanying drawings without departing from the scope of the invention, it will be understood that the preceding description is intended as illustrative and not in a limiting sense.

The embodiments of the invention in which an exclusive privilege or property is claimed are defined as follows:

1. An apparatus for selectively preventing the forward and backward movements of a vehicle including a rotatable shaft which rotates in accordance with the direction of movement of said vehicle, said apparatus comprising:
 (a) a first locking mechanism for preventing forward movement of said vehicle, said mechanism including:
  (1) A first, fixed outer tube disposed concentrically of said shaft and having a set of radial openings formed in the inner surface of the tube, each of said openings gradually increasing in depth from one side to the other thereof,
  (2) a group of rollers rotatably mounted longitudinally of and within the respective openings in said outer tube, said rollers being positioned for displacement laterally of the respective openings, and
  (3) a first inner tube disposed concentrically of and engaging said shaft for rotation therewith and longitudinally movable relative to said shaft for removable insertion within said first outer tube, the outer periphery of the inner tube engaging the peripheries of each member of the group of rollers when the former is inserted within the outer tube;
 (b) a second locking mechanism for preventing backward movement of said vehicle, said mechanism including:
  (1) a second, fixed outer tube disposed concentrically of said shaft and having a second set of radial openings formed in the internal surface thereof, each of said openings gradually increasing in depth from one side to the other,
  (2) a second group of rollers rotatably mounted longitudinally of and within the respective members of said second set of openings, said rollers being positioned for displacement latterally of said openings, and (3) a second inner tube disposed concentrically of and engaging said shaft for rotation therewith and being longitudinally movable relative to said shaft for removable insertion within said second outer tube, the outer periphery of the second inner tube engaging the peripheries of each member of the second set of rollers when the former is inserted within the second outer tube;

a torque on said shaft corresponding to a force tending to produce forward movement of said vehicle producing an opposing torque on the first set of rollers, when the first inner tube is disposed within the first outer tube, thereby wedging each member of the first set of rollers into the shallow portion of each of the first set of openings and preventing forward movement of the vehicle, and a torque on said shaft corresponding to a force tending to produce backward movement of said vehicle producing an opposing torque on the second set of rollers, when the second inner tube is disposed within the second outer tube, thereby wedging each member of the second set of rollers into the shallow portion of each of the second set of openings and preventing backward movement of the vehicle.

2. The apparatus as defined in claim 1, including means for selectively moving said first and second inner tubes lengthwise of said shaft while maintaining said tubes in rotatable engagement with said shaft, each of said means including an operating lever pivoted at one end to the respective inner tube, a fulcrum disposed intermediate the ends of said operating lever and an actuating link connected to the opposite end of the operating lever to effect pivotal movement of the operating lever and thereby effect movement of the respective inner tubes lengthwise of said shaft.

3. The apparatus as defined in claim 1, in which each of said first and second inner tubes rotatably engages said shaft by means of mating spline and groove elements, and in which each said spline element extends longitudinally of said shaft and is inclined relative to the axis thereof, thereby facilitating removal of said inner tubes from superposed relation with the corresponding outer tubes when desired.

References Cited by the Examiner

UNITED STATES PATENTS

| | | | |
|---|---|---|---|
| 838,024 | 12/06 | Hendricks | 188—82.3 |
| 1,946,177 | 2/34 | Neurath | 192—47 |
| 2,002,979 | 5/35 | Fisher | 192—47 |
| 2,209,695 | 6/40 | Heinze | 188—82.84 |

ARTHUR L. LA POINT, *Primary Examiner.*

EUGENE G. BOTZ, *Examiner.*